March 31, 1959 N. J. TROUGHT 2,879,977

MOUNTING DEVICE

Filed July 11, 1957 3 Sheets-Sheet 1

Inventor:
Norman J. Trought
By Rudolph J. Jurick
Attorney

March 31, 1959 N. J. TROUGHT 2,879,977

MOUNTING DEVICE

Filed July 11, 1957 3 Sheets-Sheet 2

Inventor:
Norman J. Trought
By Rudolph J. Jurick
Attorney

Inventor:
Norman J. Trought
By Rudolph J. Jurick
Attorney

United States Patent Office 2,879,977

Patented Mar. 31, 1959

2,879,977

MOUNTING DEVICE

Norman J. Trought, Kearny, N.J., assignor to Trought Associates, Inc., Belleville, N.J., a corporation of New Jersey Application July 11, 1957, Serial No. 671,363

17 Claims. (Cl. 257—263)

This invention relates to a mounting device and more particularly to a component holder for use in mounting either electrical or non-electrical components upon a supporting chassis.

Components, such as electron tubes, generate much heat during operation, which heat must be suitably dissipated to the surrounding atmosphere and/or mounting structure. The heat which is conducted to the mounting structure produces a temperature rise therein. As the temperature of many contemporary mounting devices rises during use, the bore, or aperture, within which the electron tube, electrical component, or other device is mounted enlarges due to the thermal expansion of the device. If the component is made of a material having a thermal coefficient of expansion which is less than that of the mounting device, the bore, or aperture, in the mounting device will enlarge at a faster rate than the component enlarges, with substantially equal temperature rises in the component and mounting device. When this occurs, the component becomes loose within the mounting device and may possibly drop, or fall, therefrom and/or, if the equipment is subjected to vibrations, the loose component is easily damaged. One important feature of my invention is the design of a mounting device in which a firm, secure, grip upon the component is maintained as the temperature of the component mounted therein rises.

Further, because of the relatively high temperatures at which electron tubes operate, proper ventilation is essential to the proper functioning and operation of the tube. The heat generated must be suitably dissipated to prevent excessively high tube temperatures. A second important feature of my invention is, therefore, the design of a mounting device which readily conducts the heat generated by the mounted component, and effectively radiates the same to the surrounding atmosphere, or other fluid coolant.

An object of this invention is the provision of a mounting device for an electrical component which device maintains a firm grip upon the component as the temperature thereof rises.

An object of this invention is the provision of a mounting device for an electrical component which grips the component tighter as the temperature of the device is increased by heat conducted thereto by the component.

An object of this invention is the provision of a mounting device for an electrical component which is provided with a pair of cooperating tapered surfaces which coact in a manner to cause the component-receiving aperture in the device to become smaller, and so to more tightly grip the component, as the temperature of the component increases during the normal course of operation thereof.

An object of this invention is the provision of a mounting device for an electrical component which functions to maintain a firm grip on the component as a result of thermal expansion of the device upon heating thereof by the component.

An object of this invention is the provision of a mounting device for an electrical component which utilizes novel ventilating means for fluid circulation past the mounting device and electrical component, for the effective dissipation of heat therefrom.

An object of this invention is the provision of a mounting device which is economically manufactured, simple in construction, of a rugged design, and which utilizes a minimum of parts.

An object of this invention is the provision of a mounting device comprising a generally cylindrical-shaped body member having a plurality of axially extending slots formed therein, the inner wall of the body member forming a component-receiving aperture of variable size, means forming an external tapered wall on the said body member, a base member having an internally-tapered bore for cooperative engagement with the tapered wall of the body member, and means securing the body and base members together in a manner permitting relative axial movement between the adjacent tapered surfaces on the said body and base members as the component temperature increases during operation thereof.

An object of this invention is the provision of a mounting device comprising a generally cylindrical-shaped body member having a plurality of axially extending slots formed therein which extend from both ends thereof and terminate a spaced distance from the ends, the inner wall of the said body member forming a component-receiving aperture of variable size, means forming a tapered edge adjacent each end of the said cylindrical-shaped member, a pair of collars each having an internally tapered bore for cooperative engagement with the tapered ends on the body member, and means securing the collars together whereby terminal expansion of the said body member during operation of the said component produces a wedging action between the collars and body member to reduce the size of the component-receiving aperture.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views.

Figure 1:
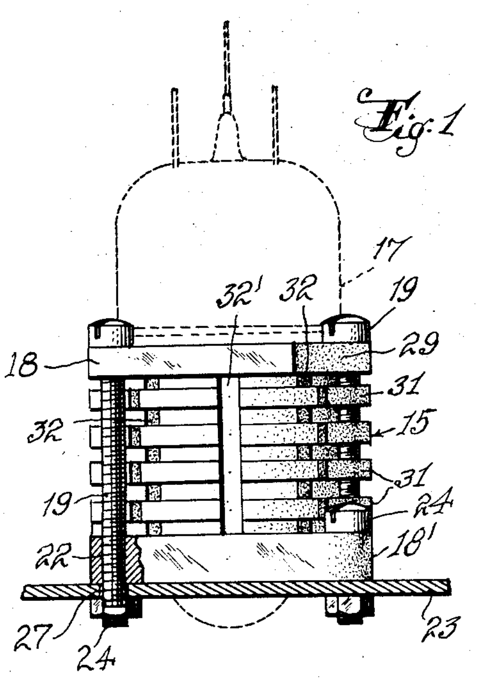
Figure 1 is a side elevational view of my novel mounting device, shown mounted on a base, or chassis, with parts broken away for clarity.
Figure 2:
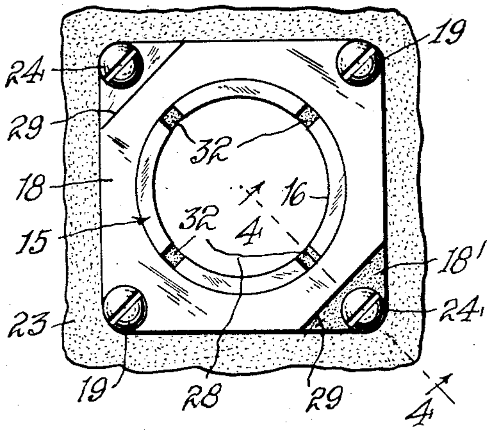
Figure 2 is a top plan view of the mounting device shown in Figure 1.
Figure 4:
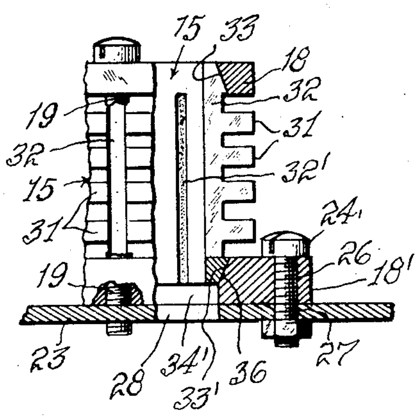
Figure 4 is a fragmentary vertical sectional view taken approximately on line 4—4 of Figure 2 and showing the end plates, or collars, in engagement with the tapered surfaces on the body member ends.
Figure 3:
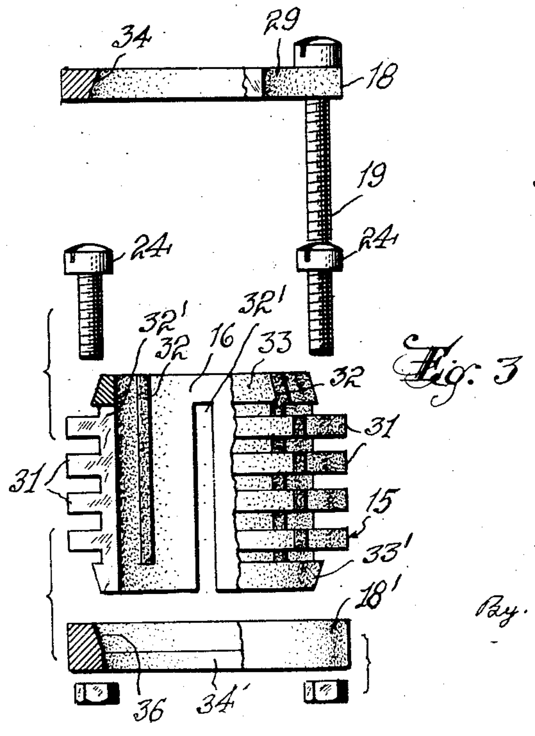
Figure 3 is an exploded side view, with parts broken away for clarity, of the mounting device.

Reference is first made to Figures 1, 2 and 3 of the drawings wherein front, top and exploded views, respectively, of a mounting device are shown, which device comprises a generally cylindrical-shaped body member 15 having a tube-receiving aperture, or bore, 16 within which a tube, designated 17 (and shown in broken lines in Figure 1) is adapted to be securely mounted. The cylindrical-shaped body member 15 is mounted between upper and lower end plates, or collars, 18 and 18'. respectively, which are fastened together by axially extending screws 19. The screws 19 extend through apertures in diagonally opposite corners of the upper end plate 18, and threadedly engage tapped holes 22 in the lower end plate 18'. The lower end plate 18' (as best seen in Figure 4) is adapted to be mounted upon a chassis 23 by means of mounting screws 24 which extend through holes 26 and 27 in the lower end plate 18' and chassis 23, respectively, adjacent diagonally opposite corners of the lower end plate. The lower end plate 18' is mounted directly over an aperture 28 in the chassis through which the end of the tube 17 may extend. Holes 27 (as seen in Figure 1) may also be formed in the chassis 23 directly adjacent the tapped holes 22 in the lower end plate 18' through which the end of the screws 19 may extend. (Obviously, such holes are unnecessary if the screws 19 are made sufficiently short to terminate within the tapped holes 22 in the lower end plate 18'.) It will be noted, also, that the diagonally opposite corners of the upper end plate may be cut off as at 29, thereby providing ready and easy access to the mounting screws 24.

The body member 15, along with the end plates 18 and 18', are preferably made of aluminum, copper, or other similar material exhibiting good heat conducting properties, whereby the dissipation of heat from the tube 17 is greatly facilitated. Heat dissipation is further facilitated by providing the body member 15 with a plurality of spaced annularly-extending fin members 31 integrally formed thereon; the fin members providing a large radiating surface from which heat may pass to the surrounding atmosphere, or other fluid coolant.

It will here be noted that although the end plates 18 and 18' are shown as being made of metal, and described above as being made preferably of aluminum or copper, the end plates may, if desired, be made of suitable electrical insulating material, such as hard plastic, or the like. By making the end plates of electrical insulating material the electron tube 17, or other electrical component supported by the device, is insulatingly mounted on the chassis 23. Such a supporting structure is necessary if the portion of the tube 17, engaged by the body member 15, is to be maintained at a potential which is different than the potential of the chassis 23; the chassis ordinarily being at ground potential.

As seen in Figures 1 through 4, the cylindrical-shaped body member 15 is provided with a plurality of axially extending slots, designated 32 and 32', which extend from both the top and bottom ends thereof, respectively, whereby the size of the tube-receiving aperture, or bore 16 is made variable. The bore may be decreased in size by exerting radial clamping forces on the body member adjacent the upper and lower ends thereof. By slotting the body member from both ends, rather than from only one end, it will be apparent that a more uniform decrease in diameter of the bore is possible upon application of the clamping force. A uniform grip on the tube 17 is thus provided.

A radial clamping force adjacent the upper and lower ends of the body member 15 is provided by the collars, or end plates 18 and 18', respectively. Referring specifically to Figures 3 and 4, it will be noted that the cylindrical-shaped body member 15 is provided with tapered annular upper and lower edges, designated 33 and 33', respectively. The upper tapered edge 33 is adapted to engage the tapered surface of an aperture 34 in the upper end plate 18, while the lower tapered edge 33' is adapted to engage the tapered surface 36 of an aperture 34' in the lower end plate 18'. As seen in Figure 4, the lower end plate 18' is made somewhat thicker than the upper end plate 18 whereby the lower edge of the body member 15 is positioned a spaced distance from the lower edge of the end plate 18' within the aperture 34'. As the screws 19 are tightened, the tapered surfaces on the body member and end plates coact to reduce the size of the tube receiving bore. The screws are tightened sufficiently to snugly and firmly clamp the tube 17 therewithin.

As mentioned above, one important aspect of my novel mounting device is that as the mounting device is heated by the tube, or other electrical component, held therein, the mounting device maintains a sure, firm, grip upon the tube, or component. Ordinarily, the component-receiving aperture in mounting devices which are made of aluminum, copper, or other relatively good heat conducting material, enlarges a greater amount than the component supported therewithin as the temperature of the component increases during operation. Thus, the tube, or other component, becomes loose and is subject to damage with resultant failure of the electronic apparatus. Of the contemporary mounting devices which do maintain a firm grip on the tube with a temperature increase, the heat dissipation therefrom is poor, or the grip is maintained by involved means or apparatus. In the operation of tubes of the type adapted to be supported by my mounting device, efficient dissipation of the heat generated by the tube is important, since the operating characteristics of the tube may be adversely effected by the resulting high temperatures. With my device, both efficient cooling, and positive clamping, of the tube is insured as the tube temperature rises in operation. The above-mentioned desirable, and essential, features of a mounting device are provided by my device in the following manner. It will be noted that the cylindrical-shaped body member 15 is in direct contact with the tube, or other electrical component mounted therewithin, and therefore, becomes hotter than the screws 19 which extend adjacent the body 15, a spaced distance therefrom. The axial thermal expansion of the screws 19 is, therefore, less than the axial thermal expansion of the body member, as the temperature of the tube rises in operation. In addition, the screws are preferably made of steel, or other suitable metal, having a lower thermal coefficient of expansion than the body member, which is made of aluminum, or other suitable material, as described above. Further, screws 19, which are threaded for their entire lengths, are preferably used, whereby the screw threads act as radiating fins for dissipation of the heat therefrom. As the body member 15 expands axially at a faster rate than the separation of the end plates 18 and 18' held together by the screws 19, coaction between the tapered surfaces on the body and end plates produces a compression of the body member whereby the size of the tube receiving aperture 16 becomes smaller. The compression action occurs at both ends of the body member (since the slots 32, 32' extend from both ends) thereby providing a relatively uniform increase in pressure on the tube, or other electrical component, mounted therewithin. Since the mounting device is made of excellent heat conducting material, the heat from the tube is readily conducted through the body member to the fin members, and from thence is radiated to the surrounding atmosphere or other fluid coolant. Thus, my novel mounting device both firmly grips the tube and effectively dissipates the heat therefrom as the temperature increases.

Obviously, there is some radial expansion of the cylindrical-shaped body member 15 when heated, which expansion partially offsets, or counteracts, the effect of compression thereof which results from the axial expansion and wedging action. It will be noted, however, that the end plates 18 and 18' are not in direct contact with the tube. Also, they present a large radiating surface to the surrounding medium for the dissipation of heat therefrom. Therefore, the end plates do not reach the temperature of the cylindrical-shaped body member. Thus, the tapered apertures in the end plates enlarge only a small amount, thereby restraining radial expansion of the body member.

Figure 6:
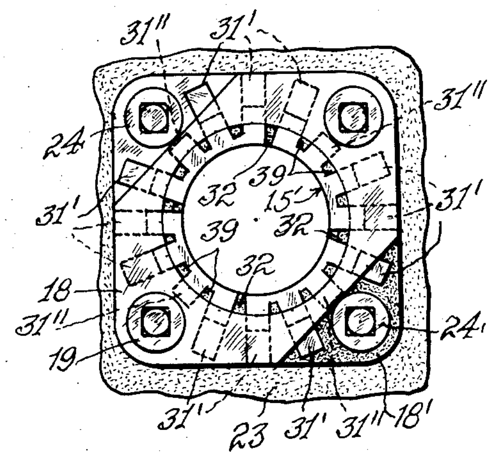
Figure 6 is a top plan view of the device shown in Figure 5.
Figure 5:
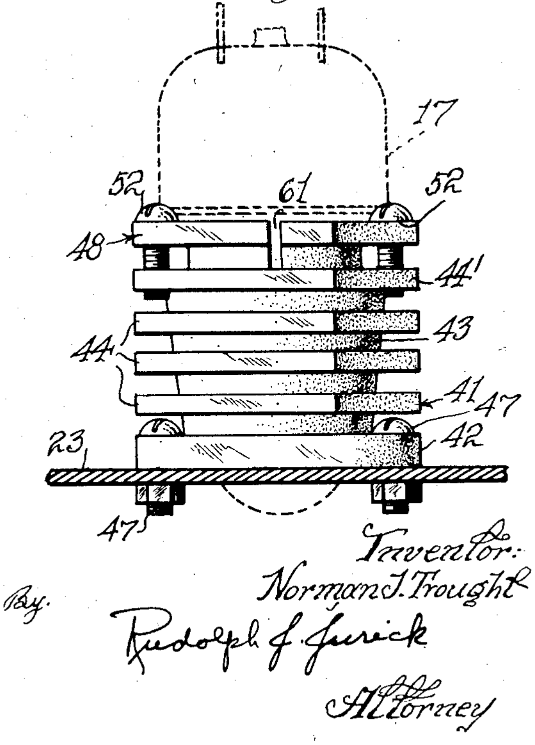
Figure 5 is an exploded side view which is similar to Figure 3 only showing a modified form of body member according to the invention.

Reference is now made to Figures 5 and 6 of the drawings wherein there is shown a modification of my novel mounting device, which modification embodies my invention. The body member of the device illustrated in Figures 5 and 6, and designated 15', is provided with a plurality of radial, axially extending fin members 31', in place of the annular fin members 31. As seen in Figure 6, four of the fin members, designated 31'', adjacent the corners of the device are shorter than the remainder of the fin members 31', thus permitting access to the mounting holes in the end plate 18' and providing adequate clearance for the screws 19. The end plates 18 and 18' are of the same construction as those used in the annularly-finned mounting device. Further, it will be understood that the initial clamping action, and further clamping action by reason of thermal expansion of the parts, is the same as described above. The axially-finned body member 15', however, provides certain advantages not found in the annularly-finned embodiment. As best seen in Figure 6, a plurality of passageways, designated 39, are formed between the aperture 34 in the upper end plate 18 and the axially extending fin members 31', 31'' on the body member 15'. Similar passageways are formed between the lower end plate 18' and body member. Thus, it will be seen that air, or other fluid coolant, may flow axially of the body member past the fin members and through the chassis, from one side of the chassis to the other. In certain applications, such circulation produces more effective cooling than is possible with annularly-finned body members.

Figure 7:
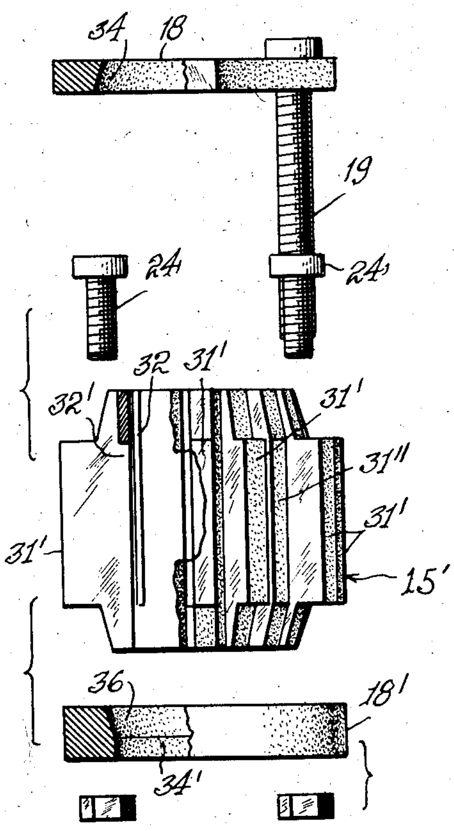
Figure 7 is a side elevational view of a further modification of the holding device embodying my invention.
Figure 8:
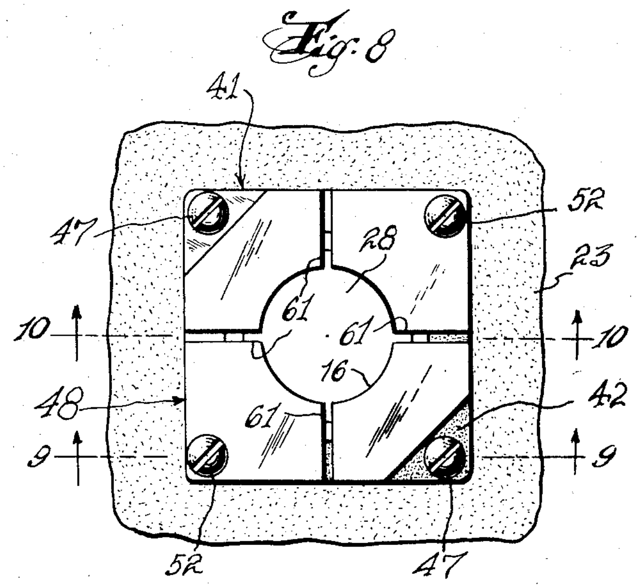
Figure 8 is a top plan view of the device shown in Figure 7.
Figure 9:
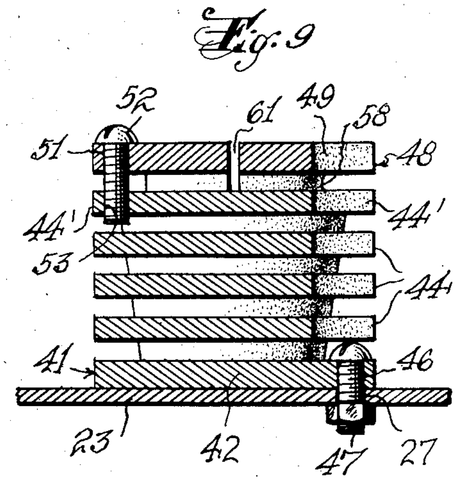
Figure 9 is a view taken on line 9—9 of Figure 8, with parts being omitted for clarity.

A further modification of my novel mounting device which also embodies my invention is shown in Figures 7 through 10 of the drawings. Referring first to Figures 7 and 8, the mounting device therein shown comprises a base member, designated generally 41, which includes an integrally formed base plate 42 and a generally frustoconical shaped body member 43 having a plurality of horizontal fin members, designated 44 and 44', integrally formed thereon. Holes 46 (as seen in Figure 9) are formed in diagonally opposite corners of the base plate 42 through which mounting screws 47 are adapted to extend for securing the base member 41 to the chassis 23; the mounting screws extending through the holes 27 formed in the chassis. Diagonally opposite corners of the fins, as well as corners of a clamping member, described below, are cut off to provide ready access to the mounting holes.

A clamping member, designated generally 48, fits within the base member 41, and is provided with a tube-receiving aperture 16 within which the tube 17 (as seen in Figure 7) is securely clamped. Referring now also to Figure 9, which is a sectional view taken on line 9—9 of Figure 8, it will be noted that the clamping member 48 includes a flange portion 49 having apertures 51 at diagonally opposite corners through which clamping screws 52 extend. The clamping screws 52 engage threaded apertures 53 in the uppermost fin member 44' whereby the clamping and base members are secured together. The fin member 44' is, preferably, of a greater thickness than the fin members 44 whereby an adequate length of threaded portion 53 for engagement with the clamping screws is provided.

Figure 10:
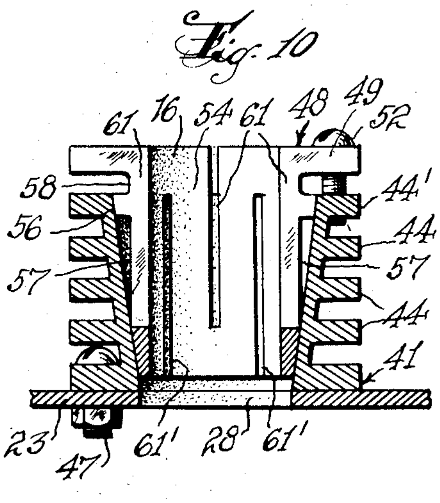
Figure 10 is a view taken on line 10—10 of Figure 8.

Reference is now made to Figure 10 of the drawings which is a sectional view taken on line 10—10 of Figure 8. As seen in Figure 10, the clamping member 48 is provided with a generally cylindrical-shaped body portion 54 formed integrally with the flange 49, and which is provided with a generally cylindrical-shaped tube-receiving aperture 16, as mentioned above. The external wall, designated 56, of the body portion 54 is tapered to fit within the tapered inner wall of the base member 41. An annular groove 57 is formed in the tapered wall 56 and serves to reduce the thickness, and thereby improve the flexibility, of the clamping member. Also, the annular groove 57 reduces the amount of friction between the cooperating tapered surfaces on the base and clamping members. A second annular groove 58 is formed beneath the flange 49, which groove also serves to improve the flexibility of the clamping member.

The clamping member 48 is also provided with a plurality of axially extending slots 61 and 61' which extend from both the top and bottom ends thereof, respectively, in the manner of the slots 32, 32' in the body members 15 and 15' described above. The tube-receiving aperture 16 is thereby substantially uniformly variable in size. As the clamping screws 52 are tightened, the clamping member 48 is moved axially downwardly into the base member 41 and through wedging action between the cooperating tapered surfaces thereon, the tube receiving aperture 16 is reduced whereby the tube, or other component, is securely held therewithin.

During the operation of the tube, or other electrical component, as the temperature thereof rises, the mounting device of Figures 7 through 10 functions in the manner of my invention to maintain a firm grip upon the tube, or other component. The clamping member 48, which is in direct contact with the tube, expands axially as the temperature thereof rises. Upward axial expansion of the clamping member 48 with relation to the base member 41 is prevented by the clamping screws 52 which connect the flange 49 on the clamping member 48 to the uppermost fin member 44' on the base member. The clamping member 48 is thereby free to expand downwardly only with relation to the base member. Downward axial expansion results in wedging action between the engaged tapered surfaces on the clamping and base members which, in turn, decreases the size of the tube-receiving bore, or aperture, 16.

The base member 41 is maintained at a lower temperature than the clamping member 48 since it is spaced from the heat source (the tube 17, that is). Further, the fin members on the base member aid in the dissipation of heat therefrom. For these reasons, the axial thermal expansion of the base member is less than that of the clamping member. The resulting relative axial movement therebetween produces the wedging, and subsequent clamping actions described above.

As in the case of the other embodiments of my invention, described above, heating of the mounting device also tends to produce a radial expansion thereof. Radial expansion of the hotter clamping member 48 is limited, however, by the cooler base member 41, which expands less in the radial direction than the clamping member. Therefore, despite some tendency for radial thermal expansion, a firm grip is maintained on the tube as a result of the coaction between the tapered surfaces on the base and clamping members upon relative axial expansion therebetween.

Having now described my invention in detail, in accordance with the requirements of the patent statutes, various other changes and modifications will suggest themselves to those skilled in this art. It is intended that such changes and modifications shall fall within the spirit and scope of the invention as recited in the following claims.

I claim:

1. A mounting device for holding an electrical component or the like comprising, a generally cylindrical-shaped body member having a component receiving bore and a plurality of axially extending slots formed therein, the said slots extending from both ends thereof, means forming an externally tapered wall adjacent each end of the said cylindrical-shaped body member, a pair of end plate members each having an internally tapered bore in cooperative engagement with the tapered walls of the body member, and means securing the end plates together whereby the engaged tapered bores and tapered walls of the respective end plate members and body member coact to reduce the size of the bore in the body member by reducing the size of the slots formed in the body member.

2. The invention as recited in claim 1 wherein the axially extending slots formed in the body member extend for less than the entire length of the body member.

3. The invention as recited in claim 1 wherein the means securing the end plates together comprises screws which are threaded substantially the entire length.

4. The invention as recited in claim 1 wherein the said means securing the said end plates together comprises a material having a smaller coefficient of thermal expansion than the material of which the said cylindrical-shaped body member is made.

5. The invention as recited in claim 1 including fin members integrally formed on the said cylindrical-shaped body member and extending outwardly therefrom between the said slots formed in the body member.

6. The invention as recited in claim 5 wherein the said fin members are of a generally annular-shape, and means forming slots in the fin members cooperating with the slots formed in the body member.

7. The invention as recited in claim 5 wherein the said fin members extend axially of the said body member.

8. A mounting device for holding an electrical component or the like comprising, a generally cylindrical-shaped body member having a component-receiving bore therein, means forming a plurality of axially extending slots in the body member which extend from both ends thereof, a plurality of axially extending fin members integrally formed on the body member and extending outwardly therefrom adjacent the slots therein, the said fin members being externally tapered adjacent each end of the said body member ends, a pair of end plates adjacent the ends of the body member and each having an internally tapered aperture in cooperative engagement with the tapered fin members, and means securing the end plates together whereby the engaged tapered fins and tapered apertures coact to reduce the size of the component-receiving bore of the body member by reducing the size of the slots formed in the body member.

9. The invention as recited in claim 8 wherein the axially extending slots in the body member extend for less than the entire length of the body member.

10. The invention as recited in claim 8 wherein the said means securing the said end plates together comprises screws which are threaded substantially the entire length.

11. The invention as recited in claim 8 wherein the said means securing the said end plates together comprises a material having a smaller coefficient of thermal expansion than the material of which the said cylindrical-shaped body member is made.

12. The invention as recited in claim 8 wherein the axially extending slots in the body member extend for less than the entire length of the body member.

13. A mounting device for holding an electrical component, or the like, comprising, a first generally cylindrical-shaped tubular member having an externally tapered wall, means forming a plurality of axially extending slots in the first member extending from both ends thereof, a second generally cylindrical-shaped tubular member having an internally tapered bore in cooperative engagement with the tapered wall of the said first member, and means joining the said first and second members together whereby the engaged tapered bore in the said second member and tapered wall of the said first member coact to reduce the size of the bore in the said first member by reducing the size of the slots formed therein, the more of the said first member further decreasing in size upon axial thermal expansion of the said first member into the tapered bore in the said second member with an increase in the temperature of a component mounted in the bore of the first member relative to the ambient temperature of the mounting device.

14. The invention as recited in claim 13 including an outwardly extending flange member integrally formed adjacent the enlarged end of the said first member, an outwardly extending flange member integrally formed adjacent the enlarged end of the tapered bore in the said second member, the said means joining the said first and second members together comprising screws extending between the said flange members.

15. A mounting device for holding an electrical component or the like comprising, a generally cylindrical-shaped body member having a component receiving bore, a plurality of axially extending slots formed in the body member and extending from the ends thereof, means forming an external taper on the said body member, a clamping member having an internally tapered bore in engagement with the external taper on the body member, and means clamping the said body member and clamping member together whereby the engaged tapered bore and tapered body member coact to reduce the size of the component receiving bore by reducing the size of the slots formed in the body member, the component receiving bore also decreasing in size upon axial thermal expansion of the body member into the tapered bore of the clamping member with an increase in the temperature of the electrical component mounted therewithin relative to the ambient temperature of the mounting device.

16. A mounting device for holding an electrical component, or the like, comprising, a generally cylindrical-shaped body member having a component receiving bore, a plurality of axially extending slots formed in the body member and extending from the ends thereof, means forming an external taper on the said body member, a clamping member having an internally tapered bore in engagement with the tapered body member, and fastening means relatively axially moving the said body member and clamping member whereby the engaged tapered bore in the clamping member and taper on the body member coact to decrease the size of the component receiving bore of the cylindrical-shaped body member, the component receiving bore decreasing in size upon axial thermal expansion of the body member into the tapered bore of the clamping member with an increase in the temperature of a component mounted therewithin relative to the ambient temperature of the mounting device.

17. The invention as recited in claim 16 wherein the axially extending slots formed in the body member extend for less than the entire length of the body member

References Cited in the file of this patent

UNITED STATES PATENTS 2,087,384 Lee ------------------ July 20, 1937

UNITED STATES PATENT OFFICE
CERTIFICATE OF CORRECTION

Patent No. 2,879,977 March 31, 1959

Norman J. Trought

It is hereby certified that error appears in the printed specification of the above numbered patent requiring correction and that the said Letters Patent should read as corrected below.

Column 8, line 8, for "more" read -- bore --.

Signed and sealed this 21st day of July 1959.

(SEAL)

Attest:

KARL H. AXLINE

Attesting Officer

ROBERT C. WATSON

Commissioner of Patents